US011492954B2

(12) United States Patent
Jochman

(10) Patent No.: US 11,492,954 B2
(45) Date of Patent: Nov. 8, 2022

(54) POWER SYSTEMS AND ENCLOSURES HAVING CONFIGURABLE AIR FLOW

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/385,073

(22) Filed: Jul. 26, 2021

(65) Prior Publication Data

US 2022/0042444 A1 Feb. 10, 2022

Related U.S. Application Data

(60) Provisional application No. 63/062,090, filed on Aug. 6, 2020.

(51) Int. Cl.
*B60H 1/32* (2006.01)
*F01P 5/02* (2006.01)
(Continued)

(52) U.S. Cl.
CPC *F01P 7/04* (2013.01); *F01P 3/18* (2013.01); *F01P 5/04* (2013.01); *F01P 5/06* (2013.01); (Continued)

(58) Field of Classification Search
CPC .... B60H 1/32; B60H 1/00521; B60H 1/0005; B60H 1/00264; B60H 1/262; F01P 5/02
See application file for complete search history.

(56) References Cited

U.S. PATENT DOCUMENTS 4,871,922 A * 10/1989 Heinrich .................. H02K 9/00 290/1 B
6,230,667 B1 * 5/2001 Stauffer .................. F02B 63/04 290/1 A
(Continued)

FOREIGN PATENT DOCUMENTS

CN 101312880 11/2008
CN 201292884 8/2009
(Continued)

OTHER PUBLICATIONS

Int'l Search Report and Written Opinion for Appln No. PCT/US2017/029655 dated Aug. 24, 2017 (15 pages).
(Continued)

*Primary Examiner* — Long T Tran
(74) *Attorney, Agent, or Firm* — McAndrews, Held & Malloy, Ltd.

(57) ABSTRACT

Power systems and enclosures having a configurable cooling air flow are disclosed. The power system includes an enclosure; an air inlet location, a first air outlet location, a second air outlet location, a fan assembly, and one or more relocatable covers to obstruct the first and second air outlet locations. The air inlet location may be at a first location on an exterior of the enclosure to permit intake of air from the exterior of the enclosure to an interior of the enclosure. The first air outlet location may be at a second location on the exterior of the enclosure to expel air taken in through the air inlet location, while the second air outlet location at a third location on the exterior of the enclosure to expel air taken in through the air inlet location.

20 Claims, 9 Drawing Sheets

(51) Int. Cl.

| | |
|---|---|
| ***F01P 7/04*** | (2006.01) |
| ***F01P 3/18*** | (2006.01) |
| ***F01P 5/06*** | (2006.01) |
| ***F02B 63/04*** | (2006.01) |
| ***F01P 5/04*** | (2006.01) |

(52) U.S. Cl.
CPC ...... *F02B 63/044* (2013.01); *F01P 2005/046* (2013.01); *F01P 2025/08* (2013.01)

(56) References Cited

U.S. PATENT DOCUMENTS

| | | | | |
|---|---|---|---|---|
| 6,390,770 | B1 * | 5/2002 | Takeshita .............. | E02F 9/0866 416/189 |
| 9,474,185 | B2 | 10/2016 | Jochman | |
| 10,371,039 | B2 | 8/2019 | Jochman | |
| 2006/0027547 | A1 | 2/2006 | Silvestro | |
| 2012/0097479 | A1 * | 4/2012 | Kelly ...................... | F02B 77/13 181/296 |
| 2016/0193912 | A1 * | 7/2016 | Minoura ................ | B60K 13/04 180/309 |
| 2017/0034957 | A1 | 2/2017 | Jochman | |
| 2019/0099824 | A1 * | 4/2019 | Taylor ....................... | F01P 7/02 |
| 2020/0025058 | A1 * | 1/2020 | Jochman .............. | H02K 7/1807 |
| 2020/0291845 | A1 * | 9/2020 | Hayashi ................ | E02F 9/0866 |

FOREIGN PATENT DOCUMENTS

| | | |
|---|---|---|
| EP | 3124158 | 2/2017 |
| WO | 2008134182 | 11/2008 |
| WO | 2010050480 | 5/2010 |
| WO | 2012100635 | 8/2012 |
| WO | 2015048544 | 4/2015 |

OTHER PUBLICATIONS

International Bureau, “International Preliminary Report on Patentability,” issued in connection with International Patent Application PCT/US2018/047469, dated Mar. 12, 2020, 8 pages.

* cited by examiner

POWER SYSTEMS AND ENCLOSURES HAVING CONFIGURABLE AIR FLOW

RELATED APPLICATIONS

The present application claims priority to U.S. Provisional Patent Application No. 63/062,090, filed Aug. 6, 2020, and entitled "Power Systems and Enclosures Having Configurable Air Flow" which is hereby incorporated by reference in its entirety.

FIELD

The present disclosure is directed to a power system with a configurable airflow, and associated methods.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures allow air to enter and exit the enclosure to cool the internal components, such as an engine and/or generator.

SUMMARY

Power systems and enclosures having configurable air flow are disclosed, substantially as illustrated by and described in connection with at least one of the figures.

According to a first aspect, a power system having a configurable airflow comprises: an enclosure; an air inlet location at a first location on an exterior of the enclosure to permit intake of air from the exterior of the enclosure to an interior of the enclosure; a first air outlet location at a second location on the exterior of the enclosure to expel air taken in through the air inlet location, wherein the enclosure defines a first air routing path to direct the air from the air inlet location to the first air outlet location; and a second air outlet location at a third location on the exterior of the enclosure to expel air taken in through the air inlet location, wherein the enclosure defines a second air routing path to direct the air from the air inlet location to the second air outlet location; a fan assembly configured to urge the air from the air inlet location, through the enclosure, and out of the interior of the enclosure via a first one of the first air outlet location and the second air outlet location; and one or more relocatable covers configured to selectively obstruct a second one of the first air outlet location and the second air outlet location.

In certain aspects, the enclosure houses a radiator and an engine, wherein the first air routing path directs the air from the air inlet location, through the radiator, over the engine, to the fan assembly, and out of the enclosure in a vertical direction.

In certain aspects, the enclosure houses a radiator and an engine, wherein the second air routing path directs the air from the air inlet location, through the radiator, over the engine, to the fan assembly, and out of the enclosure in a horizontal direction.

In certain aspects, the fan assembly and the relocatable cover are interchangeably coupled to the enclosure to enable an operator to select between the first air routing path and the second air routing path.

In certain aspects, to expel along the first air routing path, the fan assembly is positioned at the first air outlet location and the relocatable cover is positioned at the second air outlet location.

In certain aspects, to expel along the second air routing path, the fan assembly is positioned at the second air outlet location and the relocatable cover is positioned at the first air outlet location.

In certain aspects, the first location is on a first side of the enclosure, the second location is at a top of the enclosure, and the third location is on a second side of the enclosure that is different from the first side.

In certain aspects, the power system further comprises: a relocatable exhaust pipe to direct exhaust from an engine within the enclosure and out of the enclosure via a first one of a first engine exhaust location and a second engine exhaust location; and a relocatable exhaust cover configured to selectively obstruct a second one of the first engine exhaust location and the second engine exhaust location.

In certain aspects, the first engine exhaust location is at the second location and the second engine exhaust location is at the third location.

In certain aspects, the second location is on a top of the enclosure.

In certain aspects, the enclosure does not include any other air inlet locations or air outlet locations.

In certain aspects, the first air routing path and the second air routing path are each configured to direct the air to cool multiple components within the enclosure, the multiple components comprising an engine.

In certain aspects, the fan assembly comprises an electric fan with a variable speed motor.

In certain aspects, the variable speed motor is driven based on a measured temperature.

In certain aspects, the measured temperature is a temperature of a component within the enclosure, the component being an engine, an air compressor, a hydraulic pump, a welding-type power supply, or a generator.

According to a second aspect, a method for reconfiguring airflow in a power system having an enclosure and an air inlet location at a first location on an exterior of the enclosure comprises: securing a fan assembly at a first air outlet location at a second location on the exterior of the enclosure, wherein the fan assembly is configured to urge air along a first air routing path to direct the air from the air inlet location to the first air outlet location; and securing a relocatable cover at a second air outlet location at a third location on the exterior of the enclosure, wherein the relocatable cover is configured to block the second air outlet location, and wherein the second location is on a top of the enclosure and the third location is on a side of the enclosure.

In certain aspects, the method comprises the steps of: removing the fan assembly from the first air outlet location; removing the relocatable cover from the second air outlet location; securing the fan assembly at the second air outlet location to urge air along a second air routing path to direct the air from the air inlet location to the second air outlet location; and securing the relocatable cover at the first air outlet location to block the first air outlet location.

In certain aspects, the first air routing path and the second air routing path are each configured to direct the air to cool multiple components within the enclosure, the multiple components comprising an engine.

According to a third aspect, a power system having a configurable airflow comprises: an enclosure; an air inlet location at a first location on an exterior of the enclosure to permit intake of air from the exterior of the enclosure to an interior of the enclosure, wherein the first location is on a first side of the enclosure; a first air outlet location at a second location on the exterior of the enclosure to expel air taken in through the air inlet location; a second air outlet location at a third location on the exterior of the enclosure to expel air taken in through the air inlet location, wherein the second location is at a top of the enclosure and the third location is on a second side of the enclosure that is different from the first side; a fan assembly configured to urge the air from the air inlet location, through the enclosure, and out of the interior of the enclosure via a first one of the first air outlet location and the second air outlet location; and a relocatable cover configured to selectively obstruct a second one of the first air outlet location and the second air outlet location, wherein the fan assembly and the relocatable cover are interchangeable to enable an operator to select between a first air routing path to direct the air from the air inlet location to the first air outlet location and a second air routing path to direct the air from the air inlet location to the second air outlet location, wherein, to expel along the first air routing path, the fan assembly is positioned at the first air outlet location and the relocatable cover is positioned at the second air outlet location, and wherein, to expel along the second air routing path, the fan assembly is positioned at the second air outlet location and the relocatable cover is positioned at the first air outlet location.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
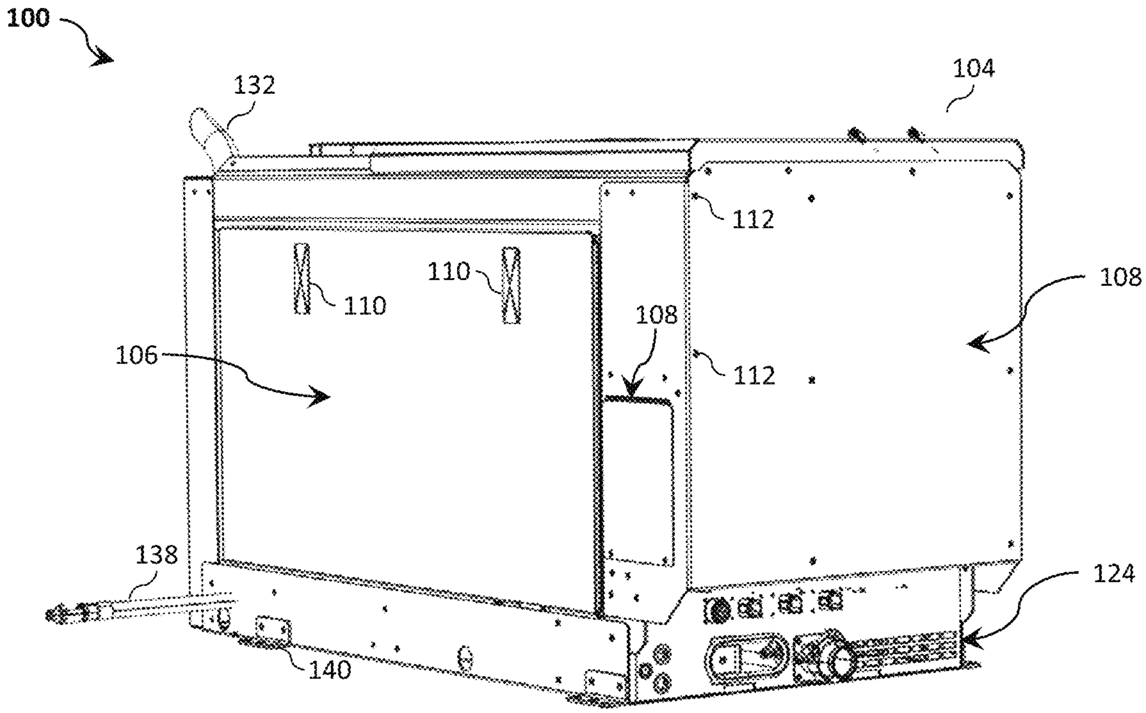
FIG. 1*a* illustrates a perspective view of an example power system having a power unit arranged within an enclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, "power conversion circuitry" refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The present disclosure is directed to a power system with a configurable airflow and associated methods. Conventionally, doors and/or panels are located on multiple sides of the power system's enclosure to provide access to the service points of the power unit within the enclosure. The enclosure may also including various air inlet and outlet openings (e.g., louvers, holes, etc.) at one or more locations to allow cooling air in and out of the enclosure as needed for cooling the internal components of the equipment.

Power systems, such as engine-driven units and other equipment, are sometimes permanently mounted to a work truck body in one or more mounting locations. Example power systems that have enclosures include engine-driven generators, welders, air compressors, and combinations thereof (e.g., a multi-use engine driven power units, such as the EnPak® power system available from Miller Electric Mfg. LLC). The mounting locations of a work truck body typically include, for example, the side on top of the tool box, the load space behind the cab (e.g., in-between the toolboxes), and/or under the deck of the body (e.g., in front of the rear axle). These three mounting locations, however, each present different airflow considerations that can pose a challenge when configuring a power system for installation in each of the mounting locations. As a result, the end-user (e.g., upfitter) must often make significant modification to the power system to enable it to work in a desired mounting location.

By way of illustration, in the case of engine-driven units, some units employ an airflow path that directs cooling air from the engine compartment, through a radiator, and then upward through the top of the enclosure via one or more baffles. While this configuration allows for the engine-driven unit to cool when positioned against a wall, the engine-driven unit cannot be readily installed in an underdeck location without considerable modification because the air outlet would be otherwise obstructed by the deck. For example, the engine-driven unit may be modified by cutting out the rear panel to define the air outlet, thereby requiring custom sheet metal modifications. In another example, an engine-driven unit may employ a fan that is mechanically driven by the engine to direct the cooling air out from the side of the enclosure. While this configuration allows the unit to cool when positioned in an underdeck location, the engine-driven unit cannot be readily installed with that side against a wall without considerable modifications because the air outlet would be otherwise obstructed by the wall. In this example, external ducting or baffling would be needed to turn the air upward.

These modifications, as can be appreciated, require extra space in the truck load space and must be custom designed for the truck body, which increases labor to the installation of the machine. In addition to the sheet metal modifications, the cooling fan is often oversized to enable the cooling fan to force the air along the airflow path, which becomes more restricted as a result of the aforementioned modifications. The configurable airflow of the example power system improves the installation of the power system by obviating the need for the end user to fabricate custom ductwork to turn the airflow outside of the machine while minimizing space needed in the vehicle for the power system.

Examples disclosed herein provide a power system with a configurable airflow that enables the end-user to reconfigure the air flow direction for a given mounting location without necessitating significant modification to the power system. For example, the power system improves cooling air flow by providing an airflow and cooling arrangement that allows for the end-user to selected between two different outlet locations for the cooling fan where the fan can urge air upward from one outlet location in one position or to the side from another outlet location in another position. Such an air flow configuration allows for the power system to be placed in, operate in, and be serviced in typical truck mounted installations without requiring sheet metal modifications or an oversized fan.

Disclosed example constructions and/or configurations of the power system's enclosure also simplifies machine design by providing a single-side service access for the components of the power systems. For example, in the case of engine-driven units, a compressor and an engine require service access for oil replacement, filter replacement, and/or any other maintenance tasks. Employing an enclosure in which the service access points are all located on one side and/or through one or more movable covers of the enclosure allows for the other sides of the unit to be placed with substantially zero clearance up against walls of an installation site (e.g., a work truck body and/or other objects).

Figure 1B:
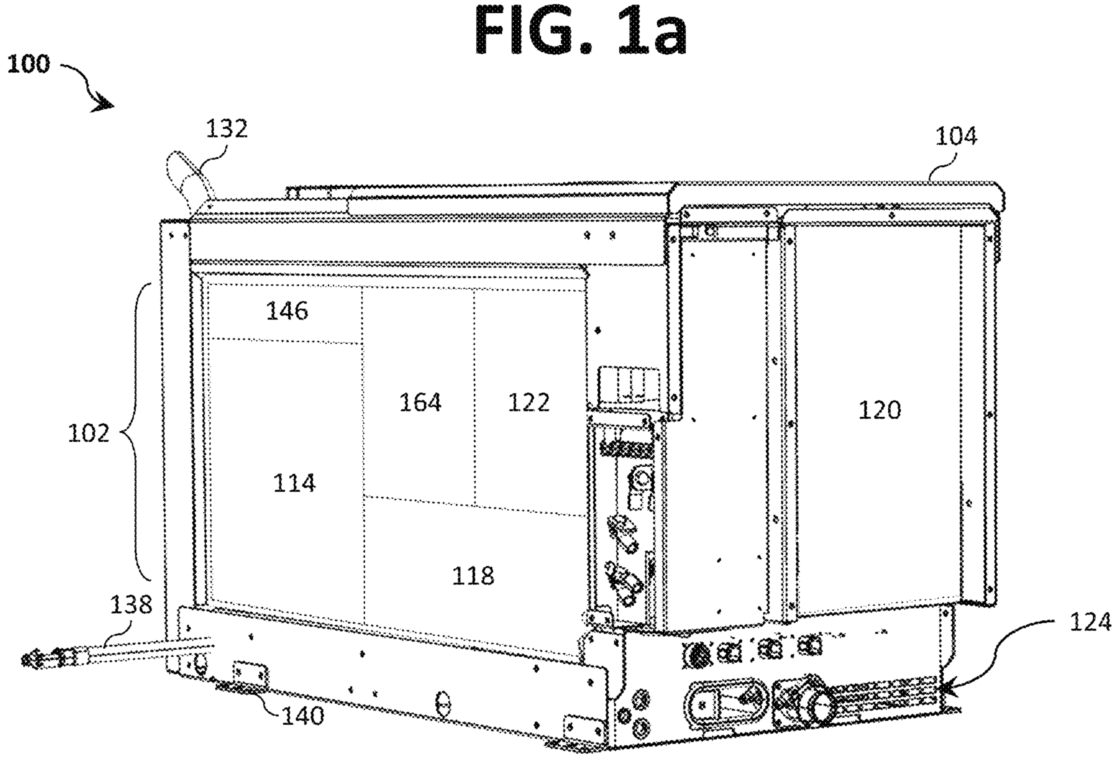
FIG. 1*b* illustrates a perspective view of the example power system with portions of the enclosure removed to better illustrate the power unit.

FIGS. 1*a* and 1*b* illustrate perspective views of an example power system 100 with a configurable airflow. Specifically, FIG. 1*a* illustrates the example power system 100 with the enclosure 104 assembled, while FIG. 1*b* illustrates the example power system 100 with selected panels of its enclosure 104 removed. The example power system 100 includes a power unit 102 arranged within an enclosure 104. The enclosure 104 is primarily constructed with sheet metal, and may include multiple panels.

Service access to the power unit 102 can be provided by a removable panel (e.g., by fasteners), a door (e.g., via a hinged panel), a void in the enclosure, or by any other suitable method or design. Therefore, one or more of the panels or portions of the enclosure 104 may be removable and/or otherwise open to permit service access to the power unit 102. For example, a primary removable access panel 106 may be secured to a lateral side of the enclosure 104 via one or more latches 110 that can span the entire length of the enclosure 104 to facilitate convenient, single-side service access to the components of the power unit 102 located within interior of the enclosure 104. In some examples, the removable access panel 106 may be hingedly coupled to the enclosure 104.

In addition to the removable access panel 106, one or more secondary removable access panels 108 may be secured to the enclosure 104 via using mechanical fasteners 112, such as screws, bolts, clips, snaps, etc. In either case, as best illustrated in FIG. 1*b*, the primary and secondary removable access panels 106, 108 may be provided at the top side, bottom side, first lateral side, second lateral side, rear side, and/or front side of the enclosure 104 to facilitate access to and maintenance of the power unit 102 or portions thereof. Relative terms (e.g., front/rear, etc.) are used to aid in the reader's understanding of the enclosure's configuration. Although relative terms are used to describe the various surfaces and sides of the enclosure 104, any side can be considered a top/bottom/front/rear/first side/second side, depending on a particular design of the power system 100, the installation configuration, and/or perspective of the viewer.

The enclosure 104 (e.g., its one or more primary and secondary removable access panels 106, 108) may be cut, punched, or otherwise shaped at one or more locations to define various openings to facilitate fluid communication (e.g., air flow) between the interior and exterior of the enclosure 104 to serve as air inlet locations 124 and air outlet locations 126*a*, 126*b* to allow cooling air in and out of the enclosure 104. The openings may be provided with or as slats, slots, holes, louvers, etc.

Figure 1C:
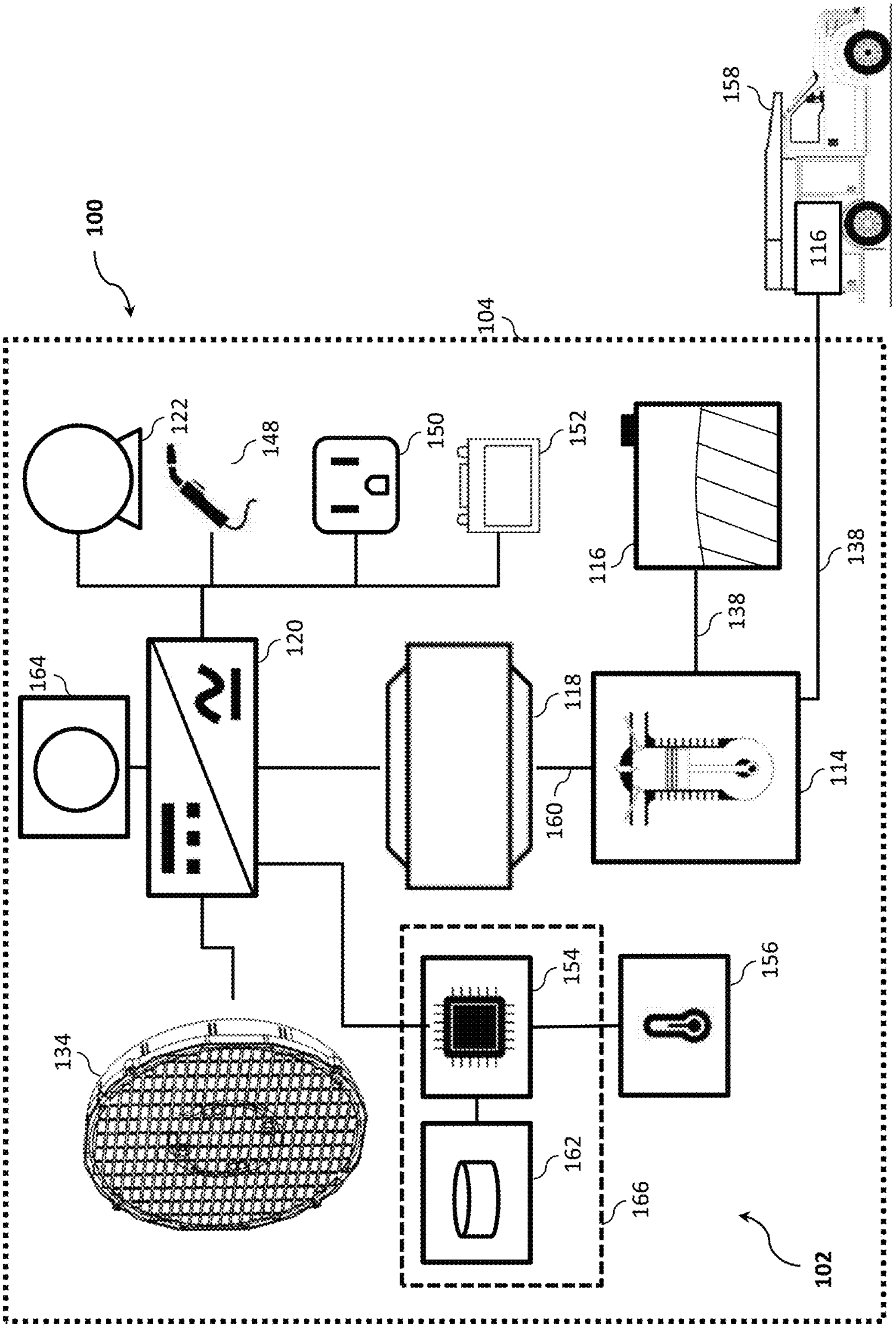
FIG. 1*c* illustrates a schematic diagram of the example power system.

The arrangements of the power unit 102 can be more easily understood from FIG. 1*c*, which illustrates the components of an engine-driven power system. As illustrated, the power system 100 includes an engine 114 and a generator 118, where the engine 114 is configured to drive a generator 118 to generate electrical power. Specifically, FIG. 1*c* illustrates a schematic diagram of the power system 100. As illustrated, the example power system 100 may comprise the engine 114, one or more fuel tanks 116, a generator 118, power conversion circuitry 120, an air compressor 122 configured to output pneumatic power, a welding-type power supply 148 configured to output welding-type power (e.g., an inverter-based welder), one or more power outlets 150, a battery charger 152, one or more fan assemblies 134, a processor 154, a memory device 162, one or more sensors 156, and/or a hydraulic pump 164 configured to output hydraulic power. The example hydraulic pump 164 and the air compressor 122 may be powered by mechanical power from the engine 114 and/or by electrical power from the generator 118. The example power system 100 may further or alternatively include other components not specifically discussed herein.

The engine 114 receives fuel from one of the one or more fuel tanks 116 via one or more fuel lines 138. The engine 114 may be a diesel or gasoline engine configured to output, for example, between 20 and 50 horse power. In one example, the engine 114 may be a small inline diesel engine. The engine 114 is controllable to operate at multiple speeds, such as an idle (e.g., no or minimal load speed) and a maximum speed (e.g., the maximum rated power of the engine 114). The engine speed may be increased and/or decreased based on the load. The engine 114 is operatively coupled with a muffler 146, which may be configured to output exhaust from the engine 114 via an exhaust pipe 132.

The fuel tank 116 may be located within the enclosure 104 or external to the enclosure 104. For example, the engine 114 may draw fuel from a fuel tank 116 that is external to the enclosure 104 via fuel line 138, such as a fuel tank 116 of the vehicle 158 (e.g., a work truck) to which the power system 100 is mounted (e.g., via mount brackets 140). The engine 114 is mechanically coupled or linked to a generator shaft of the generator 118. For example, the engine 114 is configured to output a rotational force to the generator 118 either directly or via a driveshaft 160.

The generator 118 generates output power based on the mechanical input from the engine 114. Specifically, the generator 118 is configured to generate electric power using the rotational force from the engine 114. In some examples, the generator 118 can be rigidly connected to the engine 114. The generator 118 supplies the electrical power to the power conversion circuitry 120. In some examples, the generator 118 is implemented using a high-output alternator. Collectively, the engine 114 and the generator 118 provide mechanical power and/or electrical power to power subsystems.

The power conversion circuitry 120 provides one or more types of electrical power suitable for specific and/or general purpose uses. The example power conversion circuitry 120 may include one or more power subsystems, such as the welding-type power supply 148, an auxiliary power supply configured to output AC power (e.g., 120 VAC, 240 VAC, 50 Hz, 60 Hz, etc.) and/or DC power (e.g., 12 VDC, 24 VDC, battery charging power, etc.) to the power outlets 150, and/or a vehicle power subsystem configured to convert electrical power to at least one of AC power or DC power to power or charge at least one component of a vehicle (e.g., battery charger 152), such as the vehicle 158 on which the power system 100 is mounted. The welding-type power supply 148 converts output power from the generator 118 to welding-type power based on a commanded welding-type output. The welding-type power supply 148 provides current at a desired voltage (e.g., from a user interface) to an electrode and a workpiece to perform a welding-type operation.

The power conversion circuitry 120 may include, for example, a switched mode power supply or an inverter fed from an intermediate voltage bus. Power conditioning circuitry may include a direct connection from a power circuit to the output (such as to the weld studs), and/or an indirect connection through power processing circuitry such as filters, converters, transformers, rectifiers, etc. For example, the power conversion circuitry 120 may convert, invert, or otherwise process power from the generator 118 to output an operating power to the air compressor 122 (e.g., where an electric air compressor is used), a welding power to the welding-type power supply 148, 110 VAC and/or 220 VAC power to a power outlet 150, a battery charging power to a battery charger 152 (e.g., via battery clamps), and/or any other type of electrical power. In other examples, the air compressor 122 may be driven by the engine 114 via one more belts and/or pulleys. In this example, the air compressor 122 may be a rotary screw air compressor. For example, the generator 118 may include a clutch for transmission of rotational force from the engine 114 to the air compressor 122 via the one more belts and/or pulleys.

While illustrated as separate blocks, the power conversion circuitry 120 may be integrated, or otherwise share circuitry, with other components, such as the welding-type power supply 148. For example, the power conversion circuitry 120 may be configured to provide a welding current directly to a welding torch without requiring additional circuitry or power processing.

The control circuitry 166 employs a processor 154 is operatively coupled with a memory device 162 (e.g., read-only memory (ROM), random access memory (RAM), etc.) configured to monitor and/or control the various functions and statuses of the power system 100. For example, one or more operations of the power system 100 may be controlled by the processor 154 in accordance with instructions (e.g., software algorithms) stored to a memory device 162 and/or based on an operational status of the of the power system 100.

The one or more fan assemblies 134 are configured to urge cooling air through the enclosure 104 to cool one or more components of the power unit 102. The one or more fan assemblies 134 may be controlled by the processor 154. In one example, the fan assembly 134 comprises an electric fan with a variable speed motor. Alternatively, the fan assembly 134 may be a mechanical fan that is driven by the engine 114. While an electric fan is typically less powerful than the mechanical fan, an electric fan is more efficient in the describe configuration because it is sized to fit the heat load of the power system 100 and extra external ducting is no longer needed.

While the fan assembly 134 is the primary driver of the air through the enclosure, in some examples, other components of the power system 100 may employ dedicated fans. For example, the generator 118 may include a small generator fan to specifically cool the generator windings. Like the fan assembly 134, the generator fan moves air to the first air outlet location 126*a* or the second air outlet location 126*b*. The generator fan can be significantly smaller than the fan assembly 134 and is not the primary driver of the air flow, because the generator fan is sized to cool only the generator 118.

The one or more sensors 156 (e.g., temperature sensor, humidity sensor, voltage sensors, current sensors etc.) may be located throughout the power unit 102 and configured to monitor one or more conditions of the power unit 102 or environment surrounding the power unit 102. For example, the processor 154 may be configured to monitor, via one or more sensors 156, a temperature of the engine 114, generator 118, power conversion circuitry 120, etc. The power system 100 may then control the power unit 102 based on the temperature of the environment or of the power unit 102 (or other feedback). Where the fan assembly 134 uses a variable speed motor, for example, the variable speed motor may be driven based on a measured temperature. When the temperature is low (whether due to environmental temperature or usage load), the fan assembly 134 may be operated at a lower speed to conserve power and to reduce acoustic noise; however, the fan assembly 134 may be operated at one or more higher speeds when the temperature is higher. For example, the measured temperature may be a temperature of a component within the enclosure 104 measure by the one or more sensors 156, such as the engine 114, the generator 118, the power conversion circuitry 120, the air compressor 122, the hydraulic pump 164, and/or the welding-type power supply 148. If a measured temperature deviates from an operating range, the processor 154 may disable the power unit 102 for a period of time (e.g., a cool down period).

Figure 2A:
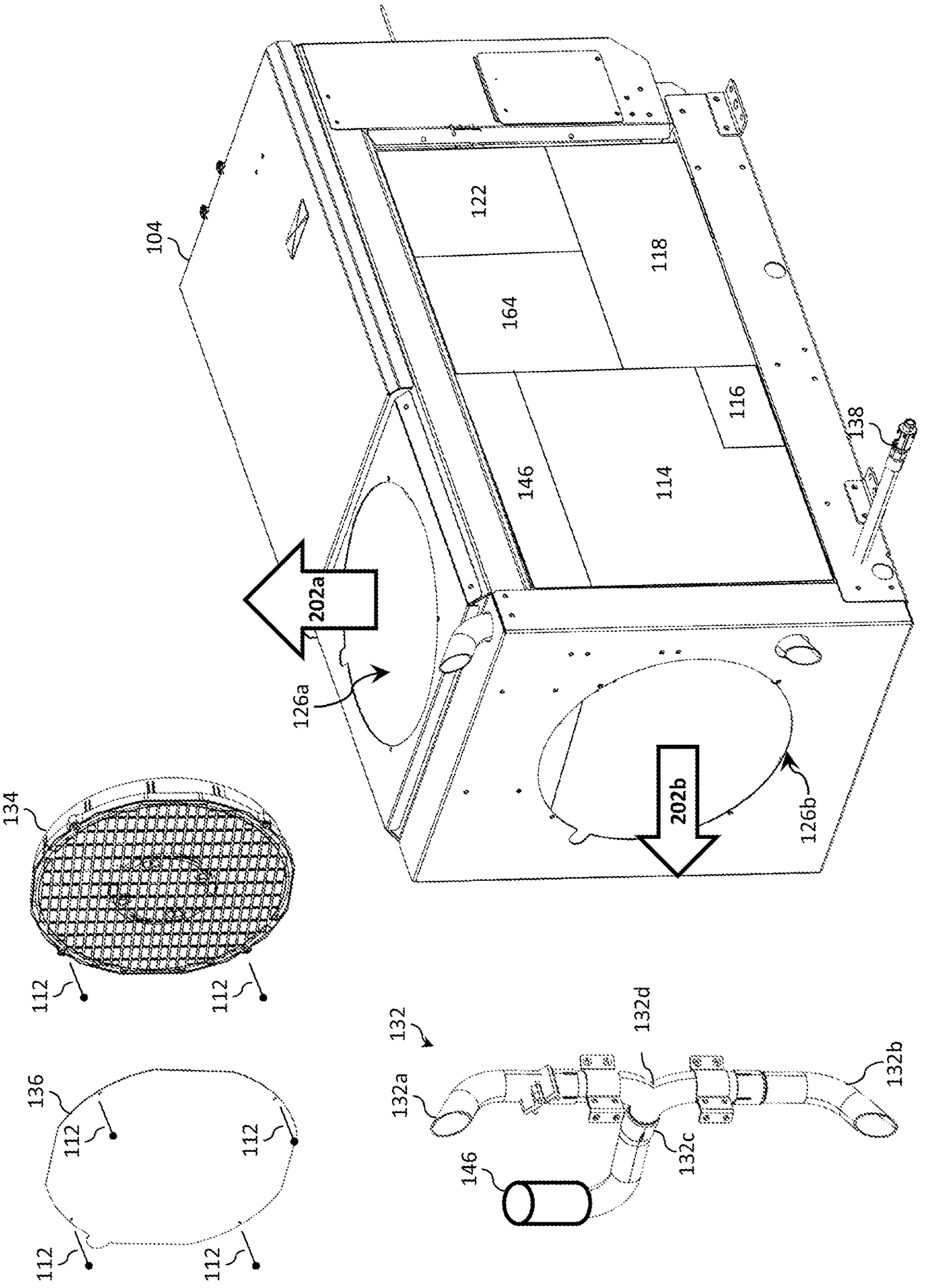
FIGS. 2*a* and 2*b* illustrate rear perspective views of the example power system with selected panels of the enclosure removed.
Figure 2B:
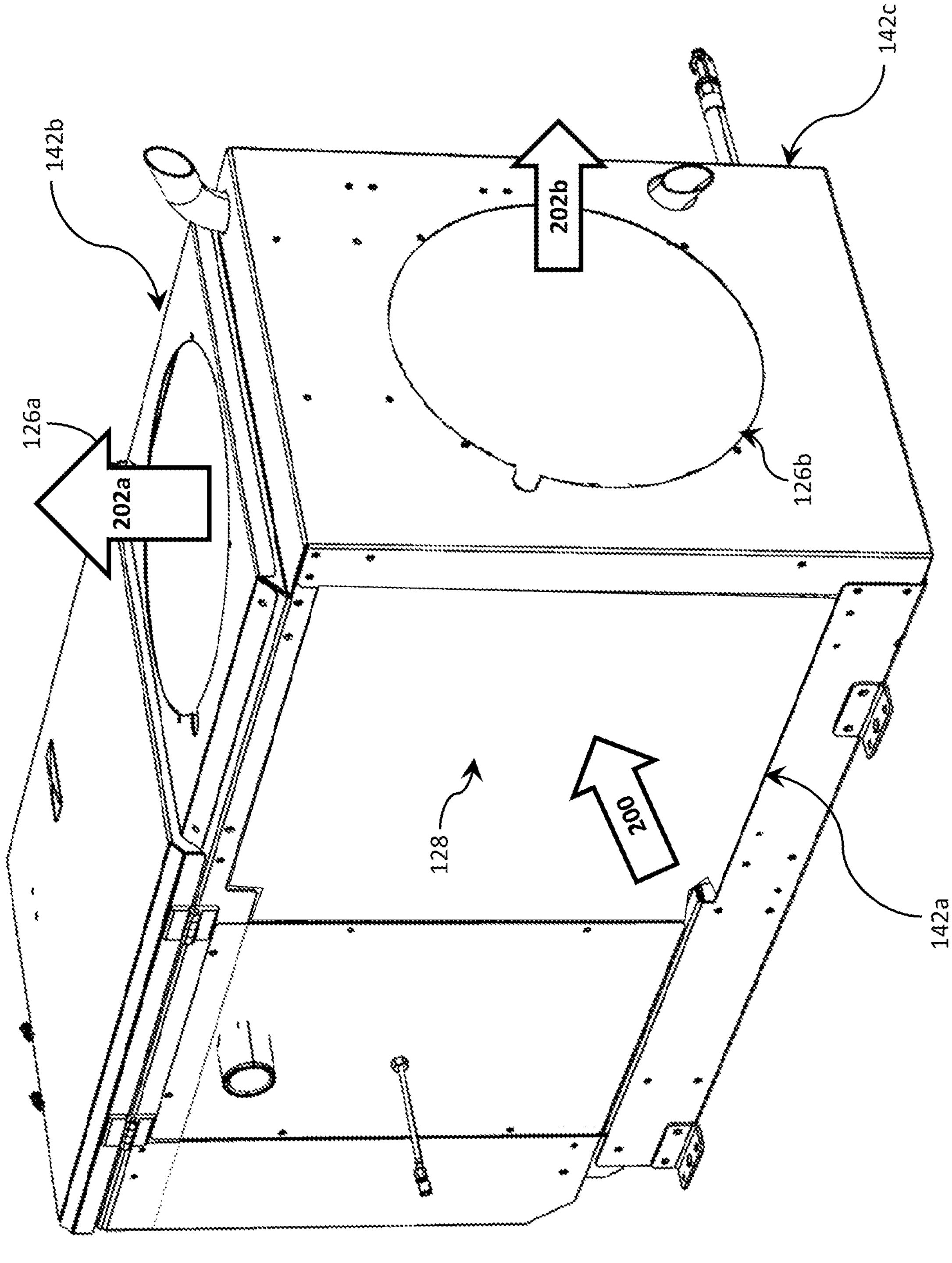
Figure 3B:
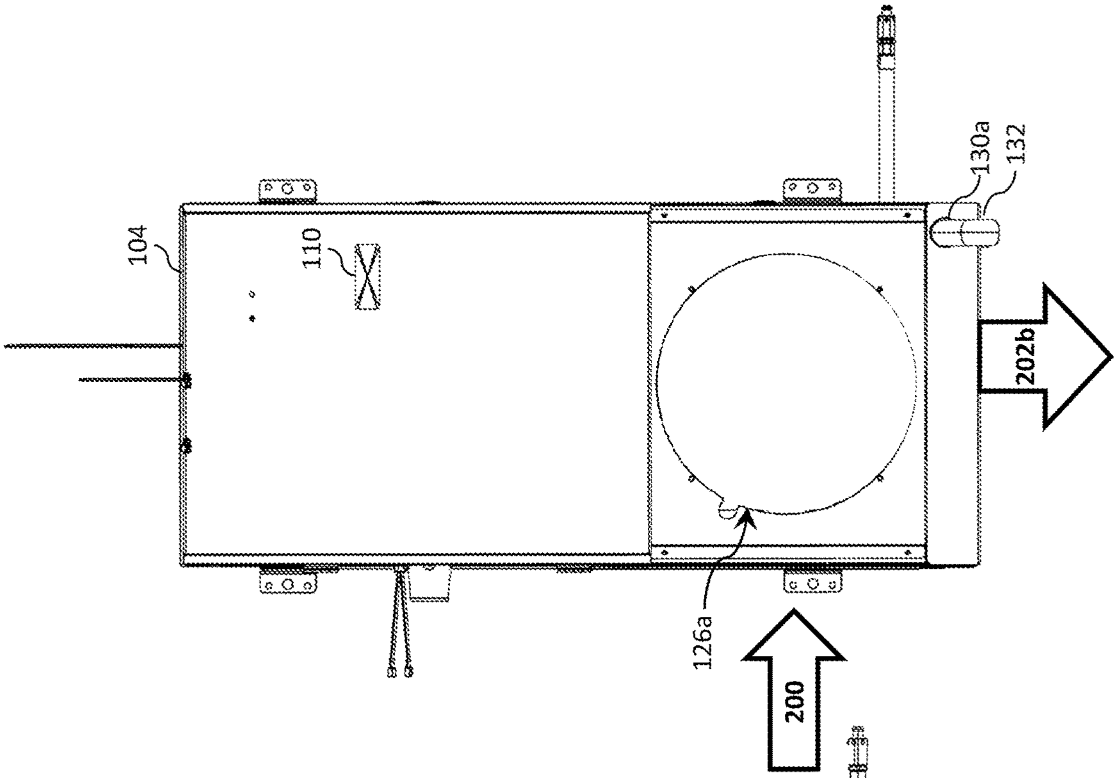
FIGS. 3*a*, 3*b*, and 3*c* illustrate, respectively, rear, top, and side views of the enclosure with the fan assembly and relocatable cover removed.
Figure 3A:
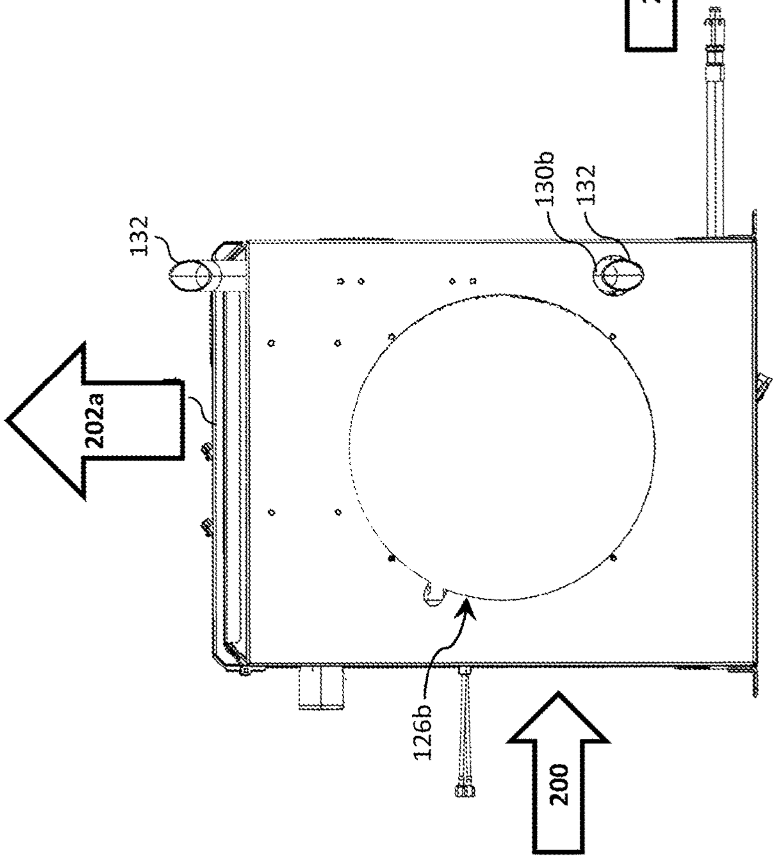
Figure 3C:
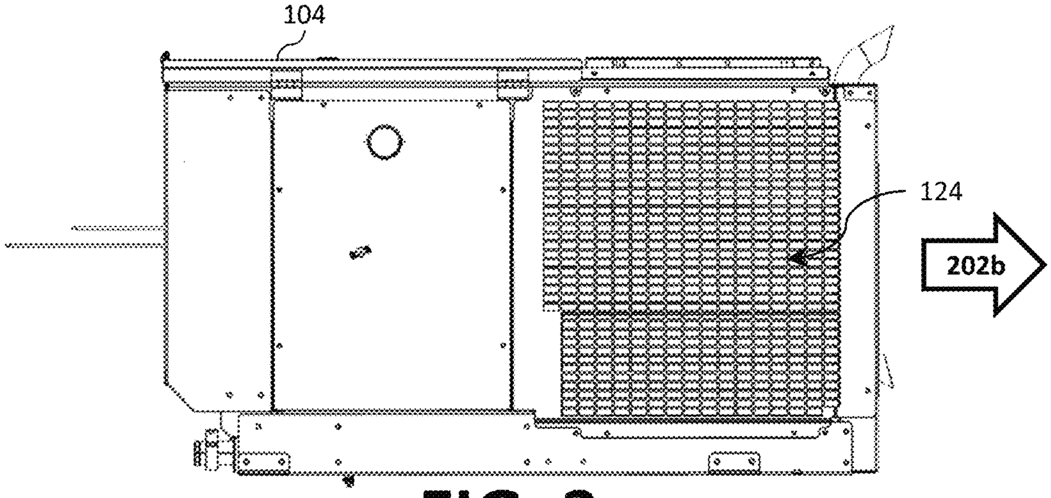
Figure 3D:
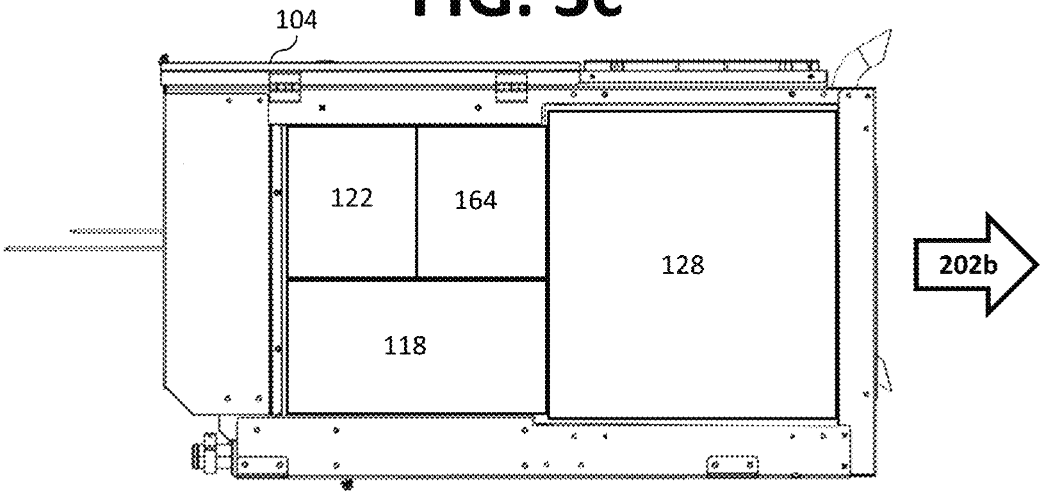
FIGS. 3*d* and 3*e* illustrate, respectively, the enclosure of FIG. 3*c* with the outer panel and the radiator removed.
Figure 3E:
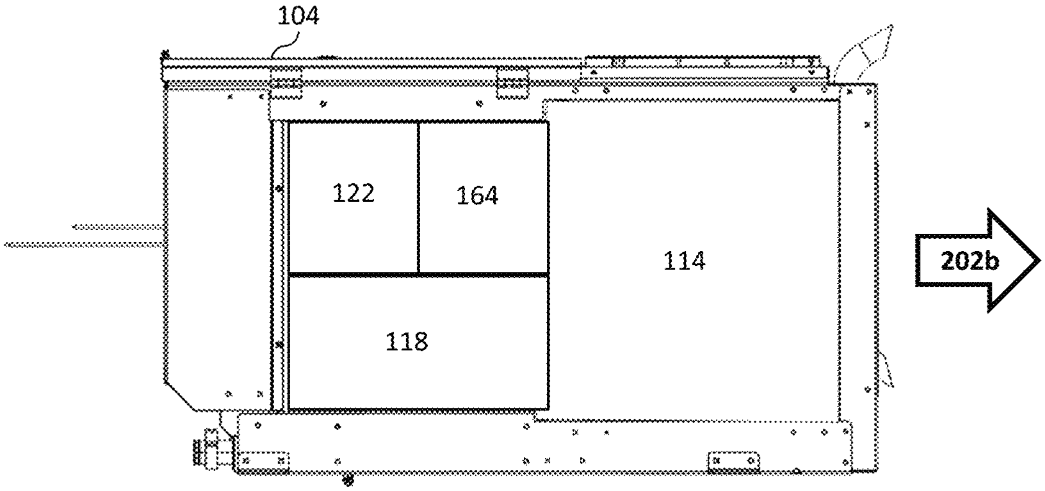

FIGS. 2*a* and 2*b* illustrate rear perspective views of the example power system 100 having a configurable airflow with selected panels of the enclosure 104 removed, whereas FIGS. 3*a*, 3*b*, and 3*c* illustrate, respectively, rear, top, and side views of the enclosure 104. FIGS. 3*d* and 3*e* illustrate, respectively, the view of FIG. 3*c* with the outer panel and the radiator 128 removed for illustrative purposes.

The enclosure 104 houses and/or supports the various components of the power system 100, such as the power unit 102, the one or more fan assemblies 134, and one or more relocatable covers 136. To allow cooling of the power unit 102, the enclosure 104 defines air inlet and outlet openings to facilitate fluid communication (e.g., air flow) between the interior and exterior of the enclosure 104. The air inlet and outlet openings can include an air inlet location 124, a first air outlet location 126*a*, and a second air outlet location 126*b*. The air inlet location 124 may be position at a first location 142*a* (e.g., at a side panel of the enclosure 104) on an exterior of the enclosure 104 to permit intake of cooling air from the exterior of the enclosure 104 to an interior of the enclosure 104

The fan assembly 134 may be relocatably coupled to the enclosure 104 to enable the end-user to reconfigure the air flow direction for a given mounting location without necessitating significant modification to the power system 100. For example, the fan assembly 134 may be sized and shaped to enable the operator to couple it to either of the first air outlet location 126*a* and the second air outlet location 126*b* to select between a first air routing path that outputs in a vertical direction 202*a* and a second air routing path that outputs in a horizontal direction 202*b*. The fan assembly 134 and the relocatable cover 136 are interchangeably coupled to the enclosure 104 to enable an operator to select between the first air routing path and the second air routing path.

The first air routing path and the second air routing path are each configured to direct the air to cool one or more components within the enclosure 104 (e.g., the engine 114, the generator 118, the power conversion circuitry 120, the air compressor 122, the hydraulic pump 164, and/or the welding-type power supply 148), but to output the cooling air in different directions to accommodate different mounting locations.

When coupled to the enclosure 104, the fan assembly 134 is configured to urge the air from one or more air inlet locations 124, through the enclosure 104, and out of the interior of the enclosure 104 via a first one of the first air outlet location 126*a* and the second air outlet location 126*b*. The one or more relocatable covers 136 configured to selectively obstruct a second one of the first air outlet location 126*a* and the second air outlet location 126*b*. The fan assembly 134 and one or more relocatable covers 136 may be coupled to the enclosure 104 at a desired air outlet location via one or more mechanical fasteners 112. In use, the fan assembly 134 is mounted in one position while the other position is covered with a relocatable cover 136.

Figure 5:
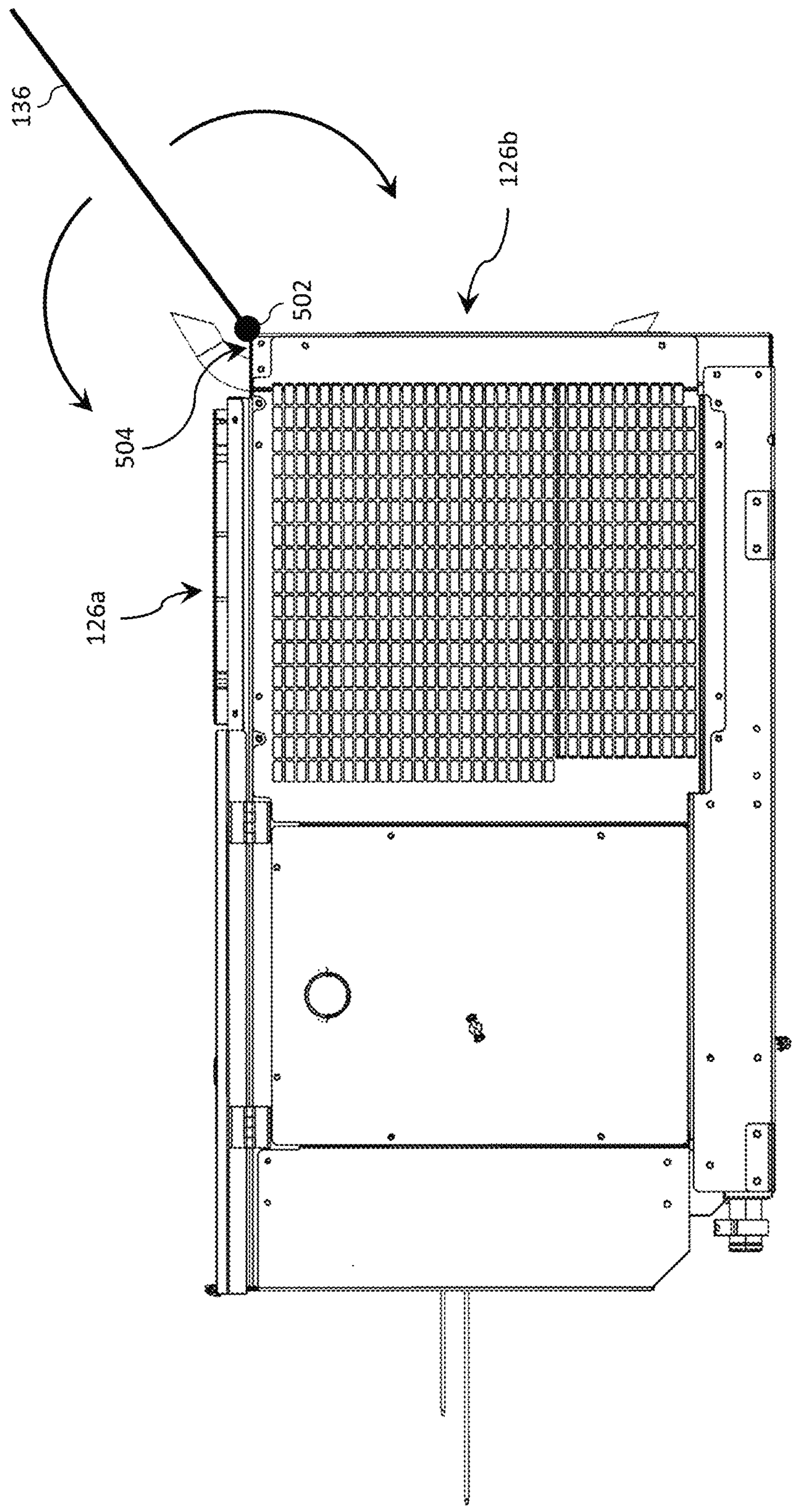
FIG. 5 illustrates a side view of the enclosure with the relocatable cover hingedly coupled to the enclosure.

To move the fan assembly 134, the end user can remove the mechanical fasteners 112 (e.g., unbolt) from the fan assembly 134 and relocatable cover 136, swap the positions of the fan assembly 134 and relocatable cover 136, and reattach the mechanical fasteners 112 to the fan assembly 134 and relocatable cover 136, thereby allowing the power system 100 to be convertible back and forth without permanent modifications to the power system 100. As illustrated in FIG. 5, the relocatable cover 136 (or the fan assembly 134) may be hingedly coupled to the enclosure 104 at an edge 504 via a hinge 502 to allow the user to effectively flip the relocatable cover 136 (or fan assembly 134) between the first and second air outlet locations 126*a*, 126*b*.

The first air outlet location 126*a* may be positioned at a second location 142*b* on the exterior of the enclosure 104 to expel air taken in through the air inlet location 124, while the second air outlet location 126*b* may be positioned at a third location 142*c* on the exterior of the enclosure 104 to expel air taken in through the air inlet location 124.

The enclosure 104 defines the first air routing path to direct the air from the air inlet location 124 to the first air outlet location 126*a* and the second air routing path to direct the air from the air inlet location 124 to the second air outlet location 126*b*. As illustrated, the second location 142*b* may be a top panel of the enclosure 104 and the third location 142*c* may be, a side panel (e.g., a backside panel) of the enclosure 104. Therefore, the first location 142*a* may be on a first side of the enclosure 104, the second location 142*b* may be at a top of the enclosure 104, and the third location 142*c* may be on a second side of the enclosure 104 that is different from the first side. In the illustrated example, the third location 142*c* is generally perpendicular to each of the first location 142*a* and second location 142*b*; however, other arrangements are contemplated. For example, the first, second, or third locations 142*a*, 142*b*, 142*c* may be positioned on other sides of the enclosure 104 (e.g., opposing sides).

As illustrated in FIG. 3*d*, the enclosure 104 houses a radiator 128 adjacent the engine 114. The radiator 128 may be located on the side of the power unit 102 of the example power system 100 that is opposite the service side of the enclosure 104 (e.g., opposite the primary removable access panel 106). For example, toward the side of the enclosure 104 that would face the passenger cab when installed in the load space of the vehicle 158. This placement positions the radiator 128 on a side of the power system 100 that receives cooling air without interfering with the fan assembly 134, which can be placed in either the top (first air outlet location 126*a*) or the rear side (second air outlet location 126*b*). The mount brackets 140 may be secured to the vehicle 158 with bolts, rivets, and/or any other type of fastener or securing mechanism to prevent movement of the power system 100 within the vehicle 158.

In operation, the first air routing path directs the air from the air inlet location 124, through the radiator 128, over the engine 114, to the fan assembly 134, and out of the enclosure 104 in a vertical direction 202*a*, while the second air routing path directs the air from the air inlet location 124, through the radiator 128, over the engine 114, to the fan assembly 134, and out of the enclosure 104 in a horizontal direction 202*b*. The air from the air inlet location 124 may be received through radiator 128 in a second horizontal direction 200. The second horizontal direction 200 may be generally perpendicular to the horizontal direction 202*b*. While overall airflow through the machine may be lower in this arrangement, the power system 100 uses the cooling air more efficiently because the cooling first hits the radiator 128 and then the engine 114 before being urged out of the enclosure 104 by the fan assembly 134. This ordering results in a short airflow path with low restriction.

As can be appreciated, air may be received from multiple air inlet locations 124, for example, a primary air inlet location 124 may be located at or near the radiator 128 and secondary air inlet locations 124 may be located elsewhere on the enclosure 104. Therefore, while the primary air inlet location 124 may be adjacent the radiator 128, it is contemplated that one or more secondary air inlet locations 124 (e.g., smaller openings) may be provided in the enclosure to provided cooling air to one or more specific components. For example, one or more secondary air inlet locations 124 may be provided near one or more of the generator 118, the power conversion circuitry 120, the air compressor 122, the hydraulic pump 164, and/or the welding-type power supply 148. In some examples, the enclosure 104 may not include secondary inlet locations 124 and, therefore, may employ only one air inlet location 124 and the first and second air outlet locations 126*a*, 126*b*. In other examples, other inlet and/or outlet locations may be included on the enclosure 104 while maintaining the first or second air routing paths as the primary cooling air flow path.

Figure 4A:
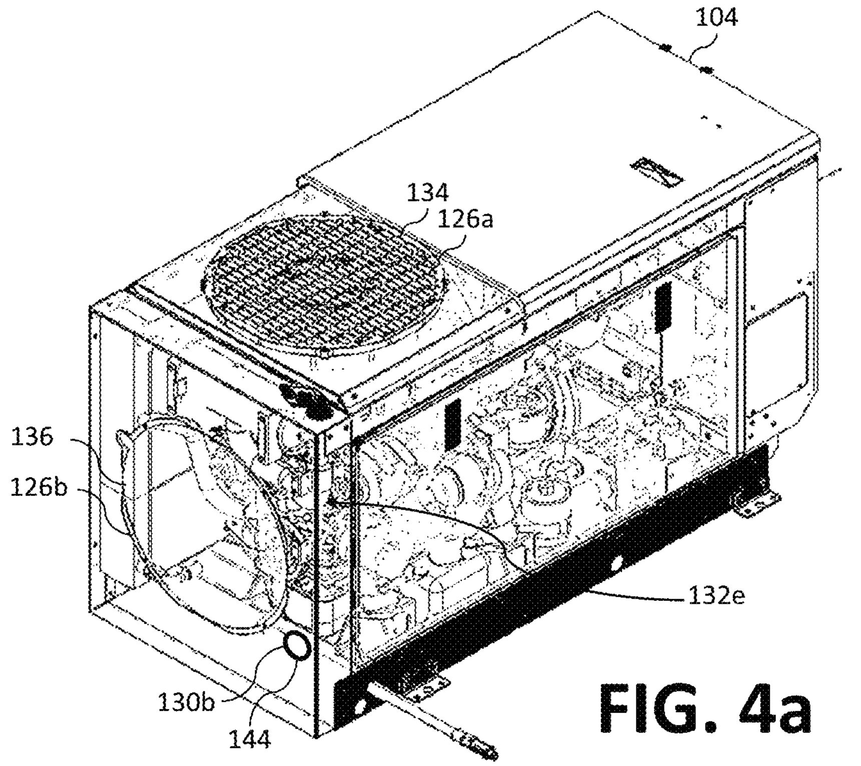
FIG. 4*a* illustrates a perspective view of the example power system with the fan assembly and relocatable cover arranged to define a first air routing path.
Figure 4B:
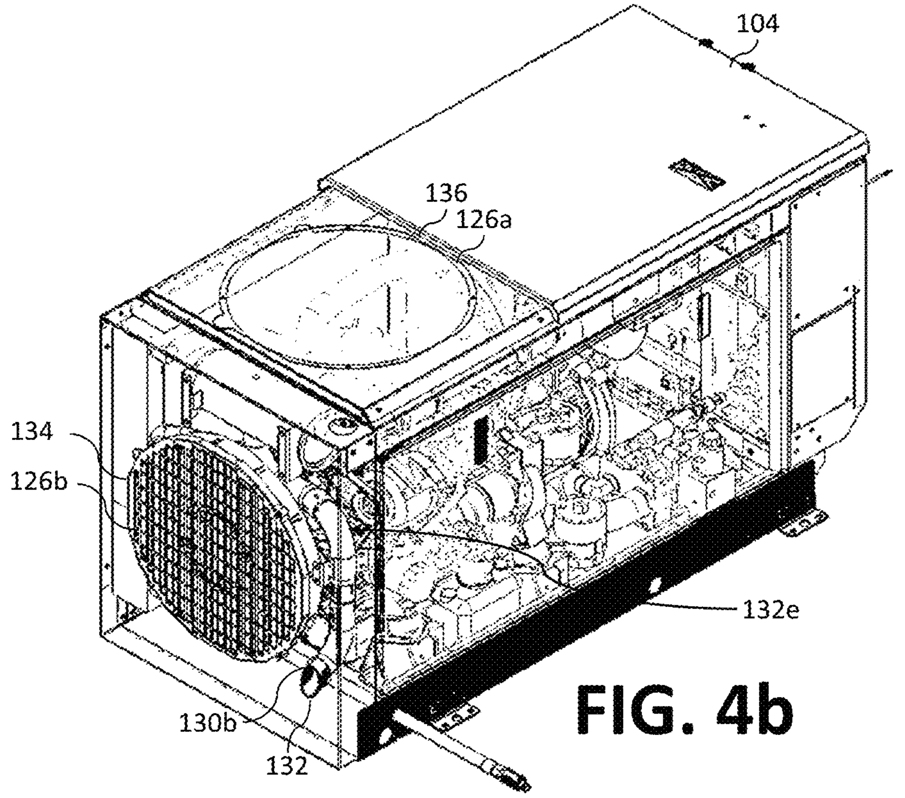
FIG. 4*b* illustrates a perspective view of the example power system with the fan assembly and relocatable cover arranged to define a second air routing path.

FIGS. 4*a* and 4*b* illustrate, respectively, perspective views of the example power system 100 with the fan assembly 134 and relocatable cover 136 arranged to define the first air routing path and the second air routing path. For example, to expel along the first air routing path in a vertical direction 202*a*, the fan assembly 134 is positioned at the first air outlet location 126*a* and the relocatable cover 136 is positioned at the second air outlet location 126*b* as illustrated in FIG. 4*a*, whereas, to expel along the second air routing path in a horizontal direction 202*b*, the fan assembly 134 is positioned at the second air outlet location 126*b* and the relocatable cover 136 is positioned at the first air outlet location 126*a* as illustrated in FIG. 4*b*.

The power system 100 may provide an exhaust pipe 132 that is reconfigurable to direct exhaust from the muffler 146 of the engine 114 within the enclosure 104 and out of the enclosure 104 via a first one of a first engine exhaust location 130*a* and a second engine exhaust location 130*b*. A relocatable exhaust cover 144 may optionally be configured to selectively obstruct a second one of the first engine exhaust location 130*a* and the second engine exhaust location 130*b*. For example, if the first engine exhaust location 130*a* is used to exhaust the engine 114, then the relocatable exhaust cover 144 may be positioned at the second engine exhaust location 130*b* (or vice versa).

In one example, as best illustrated in FIGS. 4*a* and 4*b*, a single exhaust pipe may be coupled to the coupling 132*c* of the muffler 146 via an L-connector 132*e*, in which case the L-connector 132*e* is rotated relative to the coupling 132*c* to position the exhaust pipe 132 at the desired exhaust location (e.g., the first engine exhaust location 130*a* or the second engine exhaust location 130*b*). Therefore, a single exhaust pipe may be used that is rotatable to accommodate either location. In another example, as best illustrated in FIG. 2*a*, the reconfigurable exhaust pipe 132 may employ two exhaust pipe tips 132*a*, 132*b* joined to the muffler 146 via a coupling 132*c* and a Y-connector 132*d*. In this example, a valve may be provided at the Y-connector 132*d* to selectively close off one of the two exhaust pipe tips 132*a*, 132*b* when not needed (e.g., the unused exhaust pipe). In yet another example, one of the exhaust pipe tips 132*a*, 132*b* may instead be disconnected from the Y-connector 132*d* when not needed and replaced with a plug (e.g., a cap)

Referring back to FIGS. 4*a* and 4*b*, the first engine exhaust location 130*a* may be at the second location 142*b* and the second engine exhaust location 130*b* may be at the third location 142*c*. In other words, the locations of the first and second engine exhaust locations 130*a*, 130*b* may correspond to the locations of the first and second air outlet locations 126*a*, 126*b*.

Figure 6:
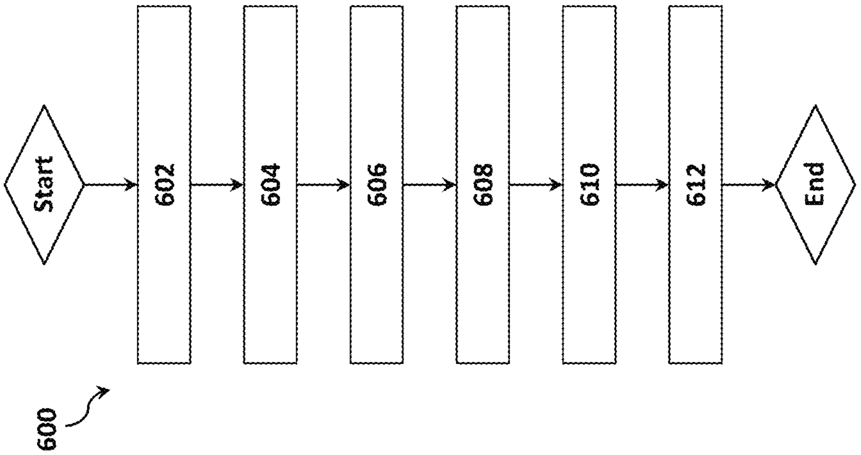
FIG. 6 is a flowchart representative of an example method for configuring the example power system of FIGS. 1 through 5.

FIG. 6 illustrates a method 600 for reconfiguring airflow in a power system 100 having an enclosure 104 and an air inlet location 124 at a first location 142*a* on an exterior of the enclosure 104. While the example method 600 is described with reference to the power system 100, the method 600 may be used with other power systems having the same or similar air flow and/or arraignment.

At block 602, a fan assembly 134 is secured at a first air outlet location 126*a* at a second location 142*b* on the exterior of the enclosure 104. The fan assembly 134 is configured to urge air along a first air routing path to direct the air from the air inlet location 124 to the first air outlet location 126*a*.

At block 604, a relocatable cover 136 is secured at a second air outlet location 126*b* at a third location 142*c* on the exterior of the enclosure 104. The relocatable cover 136 is configured to block the second air outlet location 126*b*. The first, second, and third locations 142*a*, 142*b*, 142*c*, are preferable positioned on different parts of enclosure 104. For example, second location 142*b* may be, for example on a top of the enclosure 104 and the third location 142*c* is on a side of the enclosure 104.

At block 606, the fan assembly 134 is removed from the first air outlet location 126*a*.

At block 608, the relocatable cover 136 is removed from the second air outlet location 126*b*.

At block 610, the fan assembly 134 is secured at the second air outlet location 126*b* to urge air along a second air routing path to direct the air from the air inlet location 124 to the second air outlet location 126*b*; and At block 612, the relocatable cover 136 is secured at the first air outlet location 126*a* to block the first air outlet location 126*a*.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed.

What is claimed is:

1. A power system having a configurable airflow, the power system comprising:

an enclosure;

an air inlet location at a first location on an exterior of the enclosure to permit intake of air from the exterior of the enclosure to an interior of the enclosure;

a first air outlet location at a second location on the exterior of the enclosure to expel air taken in through the air inlet location, wherein the enclosure defines a first air routing path to direct the air from the air inlet location to the first air outlet location;

a second air outlet location at a third location on the exterior of the enclosure to expel air taken in through the air inlet location, wherein the enclosure defines a second air routing path to direct the air from the air inlet location to the second air outlet location;

a fan assembly configured to urge the air from the air inlet location, through the enclosure, and out of the interior of the enclosure via a first one of the first air outlet location and the second air outlet location; and a relocatable cover configured to selectively obstruct a second one of the first air outlet location and the second air outlet location.

2. The power system of claim 1, wherein the enclosure houses a radiator and an engine, wherein the first air routing path directs the air from the air inlet location, through the radiator, over the engine, to the fan assembly, and out of the enclosure in a vertical direction.

3. The power system of claim 1, wherein the enclosure houses a radiator and an engine, wherein the second air routing path directs the air from the air inlet location, through the radiator, over the engine, to the fan assembly, and out of the enclosure in a horizontal direction.

4. The power system of claim 1, wherein the fan assembly and the relocatable cover are interchangeably coupled to the enclosure to enable an operator to select between the first air routing path and the second air routing path.

5. The power system of claim 4, wherein, to expel along the first air routing path, the fan assembly is positioned at the first air outlet location and the relocatable cover is positioned at the second air outlet location.

6. The power system of claim 4, wherein, to expel along the second air routing path, the fan assembly is positioned at the second air outlet location and the relocatable cover is positioned at the first air outlet location.

7. The power system of claim 1, wherein the first location is on a first side of the enclosure, the second location is at a top of the enclosure, and the third location is on a second side of the enclosure that is different from the first side.

8. The power system of claim 1, further comprising:

a relocatable exhaust pipe to direct exhaust from an engine within the enclosure and out of the enclosure via a first one of a first engine exhaust location and a second engine exhaust location; and a relocatable exhaust cover configured to selectively obstruct a second one of the first engine exhaust location and the second engine exhaust location.

9. The power system of claim 8, wherein the first engine exhaust location is at the second location and the second engine exhaust location is at the third location.

10. The power system of claim 1, wherein the second location is on a top of the enclosure.

11. The power system of claim 1, wherein the enclosure does not include any other air inlet locations or air outlet locations.

12. The power system of claim 1, wherein the first air routing path and the second air routing path are each configured to direct the air to cool multiple components within the enclosure, the multiple components comprising an engine.

13. The power system of claim 1, wherein the fan assembly comprises an electric fan with a variable speed motor.

14. The power system of claim 13, wherein the variable speed motor is driven based on a measured temperature.

15. The power system of claim 14, wherein the measured temperature is a temperature of a component within the enclosure, the component being an engine, an air compressor, a hydraulic pump, a welding-type power supply, or a generator.

16. A method for reconfiguring airflow in a power system having an enclosure and an air inlet location at a first location on an exterior of the enclosure, the method comprising:

securing a fan assembly at a first air outlet location at a second location on the exterior of the enclosure, wherein the fan assembly is configured to urge air along a first air routing path to direct the air from the air inlet location to the first air outlet location; and securing a relocatable cover at a second air outlet location at a third location on the exterior of the enclosure, wherein the relocatable cover is configured to block the second air outlet location, and wherein the second location is on a top of the enclosure and the third location is on a side of the enclosure.

17. The method of claim 16, further comprising the steps of:

removing the fan assembly from the first air outlet location;

removing the relocatable cover from the second air outlet location;

securing the fan assembly at the second air outlet location to urge air along a second air routing path to direct the air from the air inlet location to the second air outlet location; and securing the relocatable cover at the first air outlet location to block the first air outlet location.

18. The method of claim 17, wherein the first air routing path and the second air routing path are each configured to direct the air to cool multiple components within the enclosure, the multiple components comprising an engine.

19. A power system having a configurable airflow, the power system comprising:

an enclosure;

an air inlet location at a first location on an exterior of the enclosure to permit intake of air from the exterior of the enclosure to an interior of the enclosure, wherein the first location is on a first side of the enclosure;

a first air outlet location at a second location on the exterior of the enclosure to expel air taken in through the air inlet location;

a second air outlet location at a third location on the exterior of the enclosure to expel air taken in through the air inlet location, wherein the second location is at a top of the enclosure and the third location is on a second side of the enclosure that is different from the first side;

a fan assembly configured to urge the air from the air inlet location, through the enclosure, and out of the interior of the enclosure via a first one of the first air outlet location and the second air outlet location; and a relocatable cover configured to selectively obstruct a second one of the first air outlet location and the second air outlet location, wherein the fan assembly and the relocatable cover are interchangeable to enable an operator to select between a first air routing path to direct the air from the air inlet location to the first air outlet location and a second air routing path to direct the air from the air inlet location to the second air outlet location, wherein, to expel along the first air routing path, the fan assembly is positioned at the first air outlet location and the relocatable cover is positioned at the second air outlet location, and wherein, to expel along the second air routing path, the fan assembly is positioned at the second air outlet location and the relocatable cover is positioned at the first air outlet location.

20. The power system of claim 19, wherein the fan assembly comprises an electric fan with a variable speed motor.

* * * * *